UNITED STATES PATENT OFFICE 2,438,241

METALLATION OF BETA-KETO ESTERS

Vernon H. Wallingford, Ferguson, and August H. Homeyer, Webster Groves, Mo., assignors to Mallinckrodt Chemical Works, St. Louis, Mo., a corporation of Missouri No Drawing. Application May 17, 1945, Serial No. 594,372

4 Claims. (Cl. 260—483)

This invention relates to the metallation of organic compounds, and with regard to certain more specific features, to the replacement of active carbon-bonded hydrogen atoms of a wide variety of organic compounds with metals of the class of the alkali metals and magnesium.

Among the several objects of the invention may be noted the provision of a general process for bringing about a metallation of the type indicated which is characterized in its high yields, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Metalorganic compounds of the types, alkali metals and magnesium, are exceedingly useful intermediates for the preparation of a wide variety of organic compounds. Many processes have been devised for the preparation of such compounds, but these prior processes have usually offered one or another disadvantage, such as low yields, expensive or unavailable reaction materials, difficult reaction conditions, and the like. The present invention provides a metallation process which, so far as we can determine, is free of all such disadvantages and which consequently is a highly advantageous procedure to use to achieve the desired results.

It is difficult to define with accuracy the broad class of materials to which the process of the present invention applies. In general, it appears that the process can be satisfactorily used in all instances where metallation of the type indicated is wanted. Most of such instances seem to comprehend the replacement of an active carbon-bonded hydrogen on the organic compound with the metal, and the invention will be so described, although it is not intended thereby to so limit the scope of the invention.

From the practical standpoint, metallation of the type herein concerned is usually the formation of the sodium (sodio-) compound. But it will likewise be clearly understood that metallation with the other alkali metals, or with magnesium, is not only feasible but also expeditious according to the present invention.

Broadly speaking, the process of the present invention comprises treating the compound to be metallated with a metal alcoholate, preferably alcohol-free, in a reaction medium comprising a dialkyl carbonate. This may be represented by the following equation:

$$R.CO.CHX.CO_2Y + MOR' \xrightarrow{(R''_2CO_3)} R.CO.CX(M)CO_2Y + R'OH$$

where R and X are aromatic or aliphatic radicals, Y is an alkyl radical, M is lithium, sodium, potassium, rubidium, cesium or magnesium, R' is the radical of the alcoholate, and R'' is an alkyl.

Whether or not the dialkyl carbonate actually enters into the reaction has not yet been definitely established. Its presence appears to be an important factor.

The reaction may be forced to substantial completion by heating, as it progresses, to distill off the product alcohol (R'OH in the above equation). In case the original metal alcoholate contains alcohol, such alcohol is likewise removed by this distillation procedure. This procedure, while somewhat optional, is highly advantageous in its improvement of the yield of metallocompound obtained.

The following examples illustrate the present invention. They are exemplary only:

EXAMPLE 1

*Ethyl acetoacetate*

Sodium (11.5 g.) was dissolved in anhydrous ethyl alcohol (250 ml.) in a three-necked flask fitted with a reflux condenser. When the sodium had dissolved the condenser was arranged for distillation and the excess alcohol was distilled off and the residue was heated at reduced pressure until the sodium ethylate was substantially free of alcohol. After cooling, the solid cake of sodium ethylate was broken up. Diethyl carbonate (200 ml.) and ethyl acetoacetate (65 g.) were added and the resulting mixture was stirred until all the sodium ethylate had gone into solution. The reaction flask was connected to a small packed column arranged for distillation under reduced pressure and the metallation reaction was brought to completion by heating the reactants at 90–100° C. and the alcohol from the reaction of the sodium ethylate and the acetoacetic ester was removed as distillate at the head of the column at 41–43° under 150 mm. pressure. The metallated ester was then isolated by distilling off the diethyl carbonate under reduced pressures (150–42 mm.). There remained in the flask 84.3 g. of a slightly oily and gummy solid. The residual diethyl carbonate and the gummy, oily material present was removed by washing with isopropyl ether. On drying the product under vacuum, a high yield of a white, free-flowing, granular powder was obtained. This was sodio-acetoacetic ester.

To prove further the identity of this sodio derivative, 10.8 g. was added to ice water and acidified with acetic acid. The liberated oily material was extracted from the aqueous mixture by means of isopropyl ether, and after drying the ether solution the solvent was removed and the residual oil was distilled. A high recovery of ethyl acetoacetate, boiling at 75–76.5° C. under 18 mm. pressure was obtained.

EXAMPLE 2

*Ethyl α-n-butylacetoacetate*

Sodium ethylate, substantially free of alcohol, was prepared as in Example 1 from sodium metal (7.66 g.) and anhydrous ethyl alcohol (100 ml.). Diethyl carbonate (150 ml.) and ethyl α-n-butylacetoacetate (62 g.) were added and the resulting mixture stirred until all of the sodium ethylate dissolved. After connecting the reaction flask to a small packed column, the metallation reaction was brought to completion by heating the reactants at 90–100° C. until no more alcohol was obtained as distillate at the head of the column when under 150 mm. pressure.

The presence of a high yield of metallated ethyl α-n-butylacetoacetate was shown by isolating the metallated product in the following manner. The reaction mixture was cooled and the solid material which crystallized out was filtered off carefully and quickly, washed with isopropyl ether and a portion of it transferred to a flask containing an excess of glacial acetic acid in ice water. The liberated, oily layer was isolated by ether extraction, dried and then distilled. Ethyl α-n-butylacetoacetate was recovered almost quantitatively.

EXAMPLE 3

*Ethyl acetoacetate*

Sodium ethylate, substantially free of alcohol, was prepared as in Example 1 from 11.5 g. sodium metal and 250 ml. anhydrous ethyl alcohol. Diethyl carbonate (250 ml.) and ethyl acetoacetate (65 g.) were added to the broken up solid and the resulting mixture stirred until all of the sodium ethylate dissolved. After connecting the reaction flask to a small packed column, the metallation reaction was brought to completion by heating the reactants at 90–100° C. until no more alcohol was obtained as distillate at the head of the column under 150 mm. pressure.

The presence of a high yield of metallated ethyl acetoacetate was shown by alkylating with an excess of n-hexyl bromide. A yield of 68.7 g. (64.2%) of ethyl α-n-hexylacetoacetate was obtained.

EXAMPLE 4

*Ethyl acetoacetate*

Sodium ethylate, substantially free of alcohol, was prepared as in Example 1 from sodium metal (23 g.) and anhydrous ethyl alcohol (500 ml.). Diethyl carbonate (300 ml.) and ethyl acetoacetate (65 g.) were added to the broken up solid and the resulting mixture stirred until all of the sodium ethylate dissolved. After connecting the reaction flask to a small packed column the metallation reaction was brought to completion by heating the reactants at 90–100° C. until no more alcohol was obtained as distillate at the head of the column under 150 mm. pressure. The alcohol was collected for the most part at 41–42° C., and from its weight and refractive index it was found that 1 mole of alcohol had been liberated for each mole of sodium used. This indicated that the reaction had taken place to form the di-metallo derivative of ethyl acetoacetate in practically quantitative yields.

The presence of a high yield of the metallated ethyl acetoacetate was further shown by alkylating with an excess of ethyl bromide. A good yield of ethyl α,α-diethyl acetoacetate was obtained.

EXAMPLE 5

*Ethyl α-n-butylacetoacetate*

A diethyl carbonate solution of the metallated derivative of ethyl α-n-butylacetoacetate was prepared as described in paragraph one of Example 2 above from sodium metal (7.66 g.), anhydrous ethyl alcohol (100 ml.), diethyl carbonate (135 ml.) and ethyl α-n-butylacetoacetate (62 g.).

The presence of a high yield of metallated ethyl α-n-butylacetoacetate was shown by alkylating with an excess of n-butylbromide. A good yield of ethyl α,α-di-n-butylacetoacetate was obtained.

EXAMPLE 6

*n-Butyl benzoylacetate*

Potassium butylate, substantially free of alcohol, was prepared by the method described in Example 1 for the preparation of sodium ethylate, by dissolving potassium (12.45 g.) in n-butyl-alcohol (150 ml.) and then removing the excess alcohol under vacuum. Di-n-butyl carbonate (160 ml.) and n-butyl benzoylacetate (70 g.) were added and the resulting mixture stirred until all of the potassium butylate was dissolved. After connecting the reaction flask to a small packed column, the metallation reaction was brought to completion by heating the reactants at 90–100° C. until no more n-butyl alcohol was obtained as distillate at the head of the column under 150 mm. pressure.

The presence of a high yield of metallated n-butyl benzoylacetate was shown by alkylating with an excess of ethyl bromide. A good yield of n-butyl ethylbenzoylacetate was obtained. The boiling point of the ester was about 116–117° C. at 1 mm., and its refractive index was about $n_D^{26.2}$ 1.5003.

EXAMPLE 7

*n-Propyl β-ketononanoate*

Potassium propylate, substantially free of alcohol, was prepared by the method described in Example 1 for the preparation of sodium ethylate, by dissolving potassium metal (6.81 g.) in anhydrous n-propyl alcohol (100 ml.) and then removing the excess alcohol under vacuum. Di-n-propyl carbonate (75 ml.) and n-propyl β-ketononanoate (37.25 g.) were added and the resulting mixture stirred until all of the potassium propylate had dissolved. After connecting the reaction flask to a small packed column the metallation reaction was brought to completion by heating the reactants at 90–100° C. until no more alcohol was obtained as distillate at the head of the column under 150 mm. pressure.

The presence of a high yield of metallated n-propyl β-ketononanoate was shown by alkylating with an excess of ethyl bromide. A good yield of n-propyl α-ethyl β-ketononanoate was isolated. The boiling point of the ester was about 103–105° C. at about 1–2 mm. pressure. The index of refraction was about $n_D^{25.5}$ 1.4355.

Carrying out the above metallation procedures without the simultaneous removal, by distillation, of the alcohol produced in the reaction, is entirely feasible, but the yield is decreased from that otherwise obtainable.

Attention is directed to our copending Patent 2,391,530, which is a continuation-in-part of and was copending with our Patent 2,351,085.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:

1. The method of metallating ethyl α-n-butyl-acetoacetate, which comprises reacting the ester with anhydrous sodium ethylate, in a reaction medium consisting essentially of diethyl carbonate, and removing alcohol.

2. The method of metallating ethyl α-n-butyl-acetoacetate, which comprises mixing and heating the ester with anhydrous alcohol-free sodium ethylate, in a reaction medium consisting essentially of diethyl carbonate, and continuously subjecting the mixture to distillation for removing alcohol.

3. The method of metallating a β-keto ester of the following structure:

$$R.CO.CHX.CO_2Y$$

where R is a hydrocarbon radical selected from the group consisting of aromatic and saturated aliphatic hydrocarbon radicals, X is a saturated aliphatic hydrocarbon radical, and Y is an alkyl radical which comprises reacting the ester with an anhydrous alcoholate of a metal selected from the group consisting of sodium, potassium and magnesium, in a reaction medium consisting essentially of a dialkyl carbonate, and removing alcohol.

4. The method of metallating a β-keto ester of the following structure:

$$R.CO.CHX.CO_2Y$$

where R is a hydrocarbon radical selected from the group consisting of aromatic and saturated aliphatic hydrocarbon radicals, X is a saturated aliphatic hydrocarbon radical, and Y is an alkyl radical which comprises reacting the ester with an anhydrous alcoholate of a metal selected from the group consisting of sodium, potassium and magnesium, in a reaction medium consisting essentially of a dialkyl carbonate and subjecting the mixture to distillation for removing alcohol therefrom.

VERNON H. WALLINGFORD.
AUGUST H. HOMEYER.

REFERENCES CITED

The following references are of record in the file of this patent:

Lux, "Berichte der Deutschen pharmazeutischen Gesellschaft," vol. 62, pages 1824–1827 (1929).